United States Patent
Wu et al.

(10) Patent No.: US 10,208,252 B2
(45) Date of Patent: Feb. 19, 2019

(54) ETHYLENE-VINYL ACETATE COPOLYMER, LIQUID CRYSTAL FILM LAYER, DISPLAY PANEL AND PREPARING METHOD THEREOF

(71) Applicants: BOE TECHNOLOGY GROUP CO., LTD., Beijing (CN); BEIJING BOE OPTOELECTRONICS TECHNOLOGY CO., LTD., Beijing (CN)

(72) Inventors: Xiaojuan Wu, Beijing (CN); Kaixuan Wang, Beijing (CN)

(73) Assignees: BOE TECHNOLOGY GROUP CO., LTD., Beijing (CN); BEIJING BOE OPTOELECTRONICS TECHNOLOGY CO., LTD., Beijing (CN)

(*) Notice: Subject to any disclaimer, the term of this patent is extended or adjusted under 35 U.S.C. 154(b) by 115 days.

(21) Appl. No.: 14/785,646

(22) PCT Filed: Jun. 11, 2015

(86) PCT No.: PCT/CN2015/081213
§ 371 (c)(1),
(2) Date: Oct. 20, 2015

(87) PCT Pub. No.: WO2016/119363
PCT Pub. Date: Aug. 4, 2016

(65) Prior Publication Data
US 2016/0340585 A1 Nov. 24, 2016
US 2017/0335196 A9 Nov. 23, 2017

(30) Foreign Application Priority Data
Jan. 27, 2015 (CN) .......................... 2015 1 0041304

(51) Int. Cl.
*C09K 19/54* (2006.01)
*C08F 210/02* (2006.01)
(Continued)

(52) U.S. Cl.
CPC .......... *C09K 19/544* (2013.01); *C08F 210/02* (2013.01); *G02F 1/1334* (2013.01);
(Continued)

(58) Field of Classification Search
CPC ..................................................... C09K 19/36
See application file for complete search history.

(56) References Cited

U.S. PATENT DOCUMENTS

| 2002/0040121 A1* | 4/2002 | Hsia ...................... C08F 210/02 526/319 |
| 2007/0184212 A1* | 8/2007 | Nimura ................ G02B 5/3033 428/1.31 |

(Continued)

FOREIGN PATENT DOCUMENTS

| CN | 1488151 A | 4/2004 |
| CN | 1664676 A * | 9/2005 |

(Continued)

OTHER PUBLICATIONS

ISR issued in international application No. PCT/CN2015/081213 dated Jun. 11, 2015.
(Continued)

*Primary Examiner* — Chanceity N Robinson
(74) *Attorney, Agent, or Firm* — Nath, Goldberg & Meyer; Joshua B. Goldberg; Scott H. Blackman

(57) ABSTRACT

The present invention provides an ethylene-vinyl acetate copolymer, a liquid crystal film layer, a display panel and a preparing method thereof. The ethylene-vinyl acetate copolymer is characterized in that the mass percent of the vinyl acetate monomeric unit is 20-35% and the number average
(Continued)

molecular weight of the ethylene-vinyl acetate copolymer is 10,000-100,000. The ethylene-vinyl acetate copolymers of the invention form a network structure and have sheet shape in microscopic morphology, which allow liquid crystal molecules to be anchored in meshes of the network structure and therefore to be induced to orientate in accordance with the arrangement of the ethylene-vinyl acetate copolymers, thereby achieving the instant read-in and output of the display information. Particularly, with the ethylene-vinyl acetate copolymers, the adapted orientation of the liquid crystal molecules under the bending state of the display panel is achieved and the instant read-in and output of the display information is realized.

15 Claims, 4 Drawing Sheets

(51) Int. Cl.
*G02F 1/1334* (2006.01)
*G02F 1/1333* (2006.01)
*G02F 1/137* (2006.01)

(52) U.S. Cl.
CPC ........ *C08F 2800/20* (2013.01); *G02F 1/1333* (2013.01); *G02F 2001/13345* (2013.01); *G02F 2001/13775* (2013.01)

(56) References Cited

U.S. PATENT DOCUMENTS

| | | | |
|---|---|---|---|
| 2010/0155710 A1 | 6/2010 | Lee et al. | |
| 2015/0301385 A1* | 10/2015 | Tsunekawa | G02F 1/13363 349/12 |
| 2015/0316798 A1* | 11/2015 | Wu | C09D 123/0853 349/106 |

FOREIGN PATENT DOCUMENTS

| | | | |
|---|---|---|---|
| CN | 103992749 A | | 8/2014 |
| CN | 104530284 A | | 4/2015 |
| JP | S5887536 A | | 5/1983 |
| JP | 2003238625 A | * | 8/2003 |

OTHER PUBLICATIONS

1st office action issued in corresponding Chinese application No. 201510041304.7 dated Apr. 1, 2016.

* cited by examiner

ETHYLENE-VINYL ACETATE COPOLYMER, LIQUID CRYSTAL FILM LAYER, DISPLAY PANEL AND PREPARING METHOD THEREOF

This is a National Phase Application filed under 35 U.S.C. 371 as a national stage of PCT/CN2015/081213, filed Jun. 11, 2015, an application claiming the benefit of Chinese Application No. 201510041304.7, filed Jan. 27, 2015, the content of each of which is hereby incorporated by reference in its entirety.

FIELD OF THE INVENTION

The present invention relates to the field of macromolecule technique, particularly to an ethylene-vinyl acetate copolymer, a liquid crystal film layer, a display panel and a preparing method thereof.

BACKGROUND OF THE INVENTION

In modern life, the liquid crystal display device has been increasingly used in wide applications such as display screens of mobile phone, flat panel, GPS plotter, liquid crystal television and so on. With the improvement of the science and technology, traditional liquid crystal display device cannot satisfy the requirement for the liquid crystal display device due to its defects of large volume, high power consumption, inflexibility and the like.

The flexible display device has been widely used in portable electronic equipment, pen or touch input device and other devices due to its thinness, deformability and flexibility, low power consumption, directly visual flexible panel, small volume, convenience for transportation, etc. Currently, the flexible display technique mainly includes electronic paper technique and organic electroluminescence technique. The electronic paper display technique can be divided into liquid crystal type display, particle type display, electrochemical type display and mechanical type display. Among them the electrophoresis display of the particle type display is the most successful electronic paper display technique for its mass production.

However, the existed liquid crystal flexible display technique mainly relies on memory display, which generally needs read in and output information by heat, electricity or magnetism. The information is reserved until being erased by heat, electricity or magnetism. However, the memory display cannot realize the instant read-in and output of the display information and the adapted orientation of liquid crystal molecules particularly under the bending state of the display panel.

SUMMARY OF THE INVENTION

An object of the present invention is to solve the above problem that the display panel of the prior art cannot realize the instant read-in and output of display information as well as the adapted orientation of liquid crystal molecules under the bending state of the display panel. The object is achieved by providing an ethylene-vinyl acetate copolymer.

In the ethylene-vinyl acetate copolymer according to the present invention, the mass percent of the vinyl acetate monomeric unit is in the range of 20-35%; and the number average molecular weight of the ethylene-vinyl acetate copolymer is in the range of 10,000 to 100,000.

Preferably, the mass percent of the vinyl acetate monomeric unit in the ethylene-vinyl acetate copolymer is in the range of 25-35%.

The present invention further provides a liquid crystal film layer comprising the ethylene-vinyl acetate copolymers of the present invention, which form a network; and liquid crystal molecules dispersed in the network formed by the ethylene-vinyl acetate copolymers.

Preferably, the mass percent of the ethylene-vinyl acetate copolymers based on the liquid crystal film layer is in the range of 5-30%.

Preferably, the mass percent of the liquid crystal molecules based on the liquid crystal film layer is in the range of 70-95%.

Preferably, the liquid crystal film layer has a thickness in the range of 2-30 µm and more preferably in the range of 3-10 µm.

Preferably, the liquid crystal molecules are selected from one or more of SLC1717, E78, SLC7011, SLC099535 and SLC1011.

The present invention also provides a display panel, which comprises the liquid crystal film layer according to the present invention, a first flexible substrate on the first side of the liquid crystal film layer and a second flexible substrate on the second side of the liquid crystal film layer opposite to the first side.

The present invention further provides a method for preparing the display panel according to the present invention, which comprises the following steps:

1) mixing liquid crystal molecules with ethylene-vinyl acetate copolymers to obtain a liquid crystal mixture;

2) coating the liquid crystal mixture on the first flexible substrate so as to form a liquid crystal film layer on the first flexible substrate; and 3) contacting the second flexible substrate with the liquid crystal film layer on the first flexible substrate and laminating them together.

Preferably, in the ethylene-vinyl acetate copolymer, the mass percent of the vinyl acetate monomeric unit is in the range of 20-35%; and the number average molecular weight of the ethylene-vinyl acetate copolymer is in the range of 10,000 to 100,000.

Preferably, the mass percent of the vinyl acetate monomeric unit in the ethylene-vinyl acetate copolymer is in the range of 25-35%.

Preferably, in step 1), the mixing ratio of the liquid crystal molecules to the ethylene-vinyl acetate copolymers is in the range of 70:30 to 95:5 by mass.

Preferably, the mass percent of the ethylene-vinyl acetate copolymers based on the liquid crystal film layer is in the range of 5-30%.

Preferably, the mass percent of the liquid crystal molecules based on the liquid crystal film layer is in the range of 70-95%.

Preferably, the liquid crystal film layer has a thickness in the range of 2-30 µm.

Preferably, the liquid crystal film layer has a thickness in the range of 3-10 µm.

In the ethylene-vinyl acetate copolymer, the liquid crystal film layer and the display panel provided by the present invention, the ethylene-vinyl acetate copolymer is a linear polymer with a high molecular weight, which can form a network structure and have a sheet shape in microscopic morphology, allowing the rod like liquid crystal molecules to be anchored in the meshes of the network structure and therefore to be induced to orientate in accordance with the arrangement of the ethylene-vinyl acetate copolymers, thereby achieving the instant read-in and output of the display information. Particularly, with the ethylene-vinyl acetate copolymers of the present invention, the adapted orientation of the liquid crystal molecules under the bending state of the display panel is achieved and the overflow of the liquid crystal molecules is prevented so that they can distribute uniformly. Therefore, the instant read-in and output of the display information is realized.

DETAILED DESCRIPTION OF CERTAIN EMBODIMENTS

Figure 1:
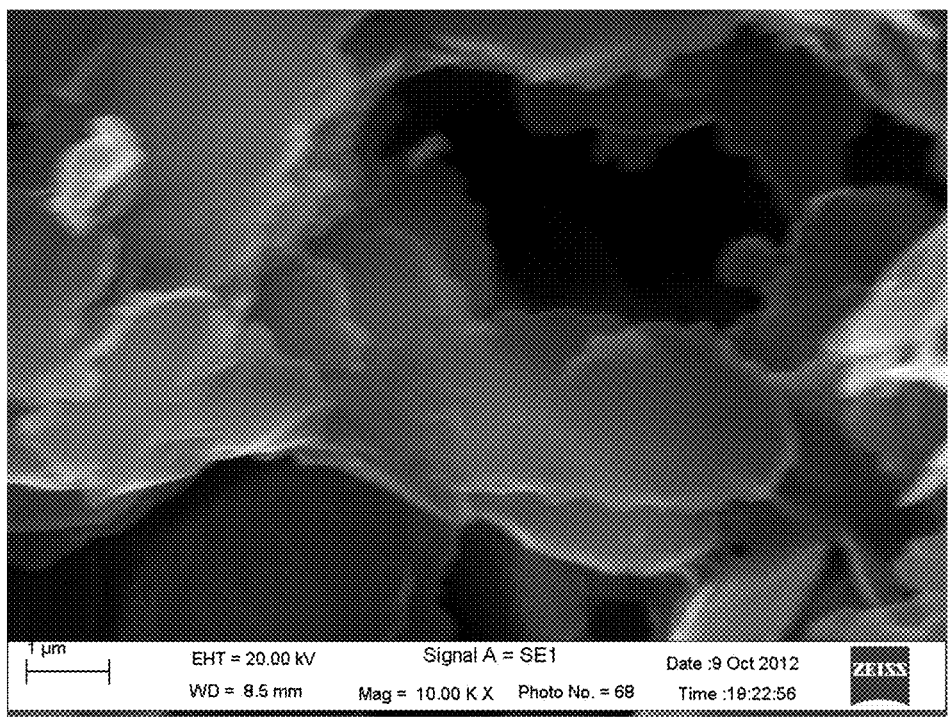
FIG. 1 is a scanning electron micrograph showing the network structure of the ethylene-vinyl acetate copolymers of Example 1 of the present invention.

In order to make those skilled in the art have a better understanding of the technical solutions of the present invention, more detailed description is provided below with reference to specific embodiments and the accompanying drawings.

The present invention provides an ethylene-vinyl acetate copolymer characterized in that in the ethylene-vinyl acetate copolymer, the mass percent of the vinyl acetate monomeric unit is in the range of 20-35%; and the number average molecular weight of the ethylene-vinyl acetate copolymer is in the range of 10,000 to 100,000.

The ethylene-vinyl acetate copolymers of the present invention are linear polymers with a high molecular weight, which tangle and form a network structure through the hydrogen bonding between oxygen atoms in vinyl acetate monomers of one copolymer and hydrogen atoms in vinyl acetate monomers of another copolymer. When the ethylene-vinyl acetate copolymers are used in a liquid crystal display panel, the rod like liquid crystal molecules can be anchored in meshes of the network structure and therefore can be induced to orientate in accordance with the arrangement of the ethylene-vinyl acetate copolymers. Thereby the instant read-in and output of the display information is achieved. Particularly, with the ethylene-vinyl acetate copolymers of the present invention, the adapted orientation of the liquid crystal molecules under the bending state of the display panel is achieved and the overflow of the liquid crystal molecules is prevented so that they can distribute uniformly. Therefore, the instant read-in and output of the display information is realized.

The ethylene-vinyl acetate copolymer is obtained by copolymerization of ethylene and vinyl acetate and it can be represented by the following structure formula:

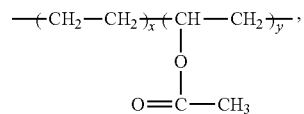

wherein x represents the number of the ethylene monomeric unit and y represents the number of the vinyl acetate monomeric unit. The property of the ethylene-vinyl acetate copolymer is primarily determined by the molecular weight thereof and the content of the vinyl acetate monomeric unit.

The molecular weight of the ethylene-vinyl acetate copolymer is inversely proportional to the melt index thereof. In order to ensure the melt index to be in a certain range which facilitates the processing of the ethylene-vinyl acetate copolymer, the molecular weight of the ethylene-vinyl acetate copolymer is required to be in an appropriate range. If the molecular weight of the ethylene-vinyl acetate copolymer is too low, the network structure is hard to be formed or, if formed, the anchor effect of the network on the small-molecular liquid crystals is not strong. On the other hand, if the molecular weight is too high, the ethylene-vinyl acetate copolymer is hard to be processed.

In the present invention, it is more preferably that the number average molecular weight of the ethylene-vinyl acetate copolymer is in the range of 30,000 to 80,000, and most preferably in the range of 30,000 to 50,000.

The polarity of the acetate group of the vinyl acetate monomeric unit may increase the elasticity and viscosity of the copolymer. When the melt index (determined by both molecular weight and viscosity) is given, the elasticity, flexibility, compatibility and transparency of the copolymer are improved with the increase of the content of the vinyl acetate monomeric unit, which leads to the formation of a network structure with a higher density and a stronger anchoring ability such that the liquid crystal molecules is easier to be orientated and the flexibility of the display panel is superior.

In the present invention, it is more preferably that the mass percent of the vinyl acetate monomeric unit in the ethylene-vinyl acetate copolymer is in the range of 25-35%, and most preferably in the range of 30-35%, based on the total mass of the ethylene-vinyl acetate copolymer.

It should be understood that the ethylene-vinyl acetate copolymer can be prepared by any method known in the art as long as the number average molecular weight of the copolymer and the mass percent of the vinyl acetate monomeric unit in the copolymer fall within the above ranges.

The morphology under scanning electron microscope (ZeissEVO18, available from ZEISS Company) of the ethylene-vinyl acetate copolymers of Example 1 of the present invention is shown in FIG. 1. It can be seen from FIG. 1 that the ethylene-vinyl acetate copolymers form a network structure and have sheet shape in microscopic morphology, which allows small-molecular substances (e.g. the liquid crystal molecules) to be anchored in the meshes of the network structure and to be induced to orientate in accordance with the arrangement of the ethylene-vinyl acetate copolymers.

The present invention also provides a liquid crystal film layer which comprises: the ethylene-vinyl acetate copolymers according to the present invention, which form a network; and liquid crystal molecules dispersed in the network formed by the ethylene-vinyl acetate copolymers.

In the liquid crystal film layer of the present invention, the ethylene-vinyl acetate copolymers are used as the dispersion medium of the liquid crystal molecules.

Preferably, the mass percent of the ethylene-vinyl acetate copolymers of the present invention based on the liquid crystal film layer is in the range of 5-30%, more preferably in the range of 10-25%, and most preferably in the range of 15-25%.

When the content of the ethylene-vinyl acetate copolymers in the liquid crystal film layer is too low, it is not sufficient to anchor the liquid crystal molecules; when the content of the ethylene-vinyl acetate copolymers is too high, the display effect of liquid crystals will be affected due to the deficiency of the property of the liquid crystal.

It is preferably that the mass percent of the liquid crystal molecules based on the liquid crystal film layer is in the range of 70-95%.

Preferably, the thickness of the liquid crystal film layer is in the range of 2-30 μm, and more preferably in the range of 3-10 μm.

If the liquid crystal film layer is too thin, the transmittance of the display device will be affected; however, if the liquid crystal film layer is too thick, the power consumption of the display device will be increased and the liquid crystal molecules will be hard to be orientated.

In the present invention, the liquid crystal molecules may be selected from one or more of SLC1717, E78, SLC7011, SLC099535 and SLC1011, wherein SLC1717, SLC7011, SLC099535 and SLC1011 are available from Chengzhi Yonghua Liquid Crytal Materials Co., Ltd. and E78 is available from Merk Company. It should be understood that any other type of liquid crystal molecule used for the liquid crystal display device known in the prior art can be used as long as the liquid crystal molecule can be dispersed in the meshes of the network structure formed by the ethylene-vinyl acetate copolymers.

Figure 2:
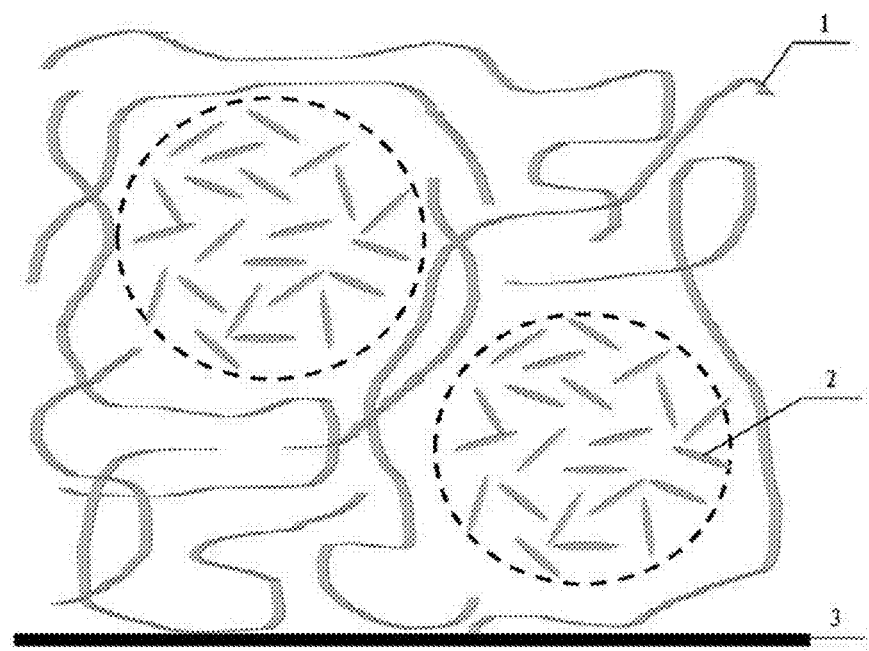
FIG. 2 is a schematic view showing the molecular arrangement of the mixture of the liquid crystal molecules and the ethylene-vinyl acetate copolymers in the liquid crystal film layer of the present invention.

FIG. 2 is a schematic view showing the molecular arrangement of the mixture of the liquid crystal molecules 2 and the ethylene-vinyl acetate copolymers 1 in the liquid crystal film layer. It can be seen from FIG. 2 that since the liquid crystal molecules 2 and the ethylene-vinyl acetate copolymers 1 are immiscible, the liquid crystal molecules 2 are present in the meshes formed by the ethylene-vinyl acetate copolymers 1 and arrange randomly. The reference number 3 in FIG. 2 represents the first flexible substrate.

It should be understood that the liquid crystal film layer of the present invention can further contain other components that are conventionally used in the liquid crystal film layer as required, such as chiral additive and the like.

The present invention also provides a display panel, which comprises the liquid crystal film layer according to the present invention, a first flexible substrate on the first side of the liquid crystal film layer, and a second flexible substrate on the second side of the liquid crystal film layer opposite to the first side.

It should be understood that the first flexible substrate can be a flexible substrate with an electrode made of indium tin oxide, and the second flexible substrate can be a flexible array substrate.

The present invention further provides a method for preparing the display panel according to the present invention, which comprises the following steps:

1) mixing liquid crystal molecules with ethylene-vinyl acetate copolymers to obtain a liquid crystal mixture;

2) coating the liquid crystal mixture on the first flexible substrate so as to form a liquid crystal film layer on the first flexible substrate; and 3) contacting the second flexible substrate with the liquid crystal film on the first flexible substrate and laminating them together.

In the method, the ethylene-vinyl acetate copolymers are the ethylene-vinyl acetate copolymers according to the present invention. The liquid crystal molecule may be selected from one or more of SLC1717, E78, SLC7011, SLC099535 and SLC1011, wherein SLC1717, SLC7011, SLC099535 and SLC1011 are available from Chengzhi Yonghua Liquid Crytal Materials Co., Ltd. and E78 is available from Merk Company. It should be understood that, any other type of liquid crystal molecule used for the liquid crystal display device known in the prior art can be used as long as the liquid crystal molecule can be dispersed in the meshes of the network structure formed by the ethylene-vinyl acetate copolymers.

In the step 1), the mixing ratio of the liquid crystal molecules to the ethylene-vinyl acetate copolymers can be in the range of 70:30 to 95:5 by mass, and more preferably in the range of 80:20 to 85:15.

Figure 3:
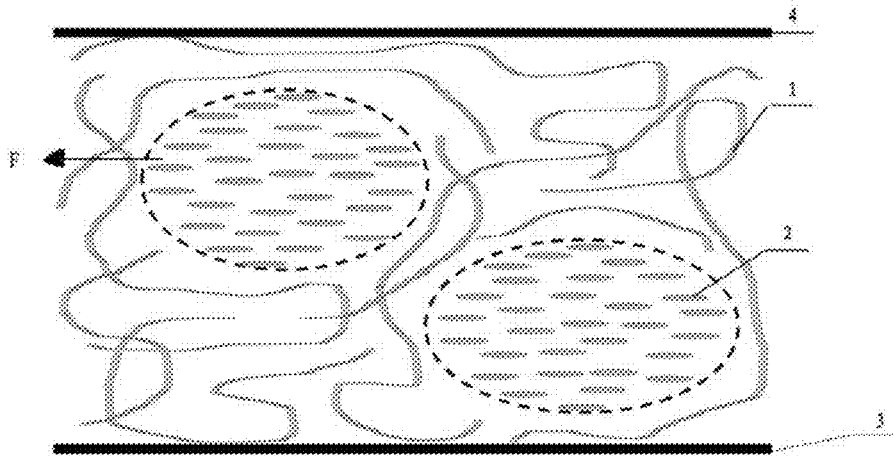
FIG. 3 is a schematic view showing the molecular arrangement of the mixture of the liquid crystal molecules and the ethylene-vinyl acetate copolymers in the flexible display panel of the present invention.

As shown in FIG. 3, in the flexible liquid crystal display panel of the present invention, the ethylene-vinyl acetate copolymers 1 are arranged along the direction parallel to the first flexible substrate 3 and the second flexible substrate 4 (i.e. the meshes take ellipse shape with the long axis paralleling to the direction shown by the arrow) under the action of the transverse shear force (the direction of the shear force F is shown by the arrow) upon aligning and pressing the two substrates; meanwhile the liquid crystal molecules 2 around the ethylene-vinyl acetate copolymers are induced to orientate in the same manner (i.e. the long axes of the liquid crystal molecules are parallel to the direction shown by the arrow), such that the long axes of the liquid crystal molecules are arranged along the direction parallel to the substrates. When no voltage is applied to the array substrate, the long axes of the liquid crystal molecules are always orientated along the direction parallel to the substrates. When a voltage is applied to the array substrate, the deflection of the liquid crystal molecules can be controlled so as to realize the instant read-in and output of the display information.

Figure 4:
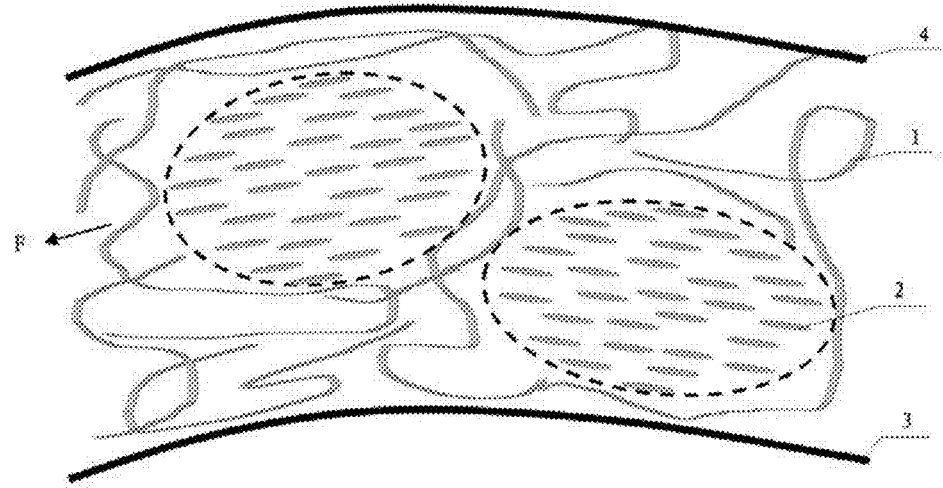
FIG. 4 is a schematic view showing the molecular arrangement of the mixture of the liquid crystal molecules and the ethylene-vinyl acetate copolymers when the flexible display panel of the present invention is bent.

Furthermore, as shown in FIG. 4, in the event that the flexible substrates 3 and 4 are bent, the adapted orientation of the liquid crystal molecules 2 in the bent portion can also be achieved and thus the instant read-in and output of the display information is realized.

Figure 5:
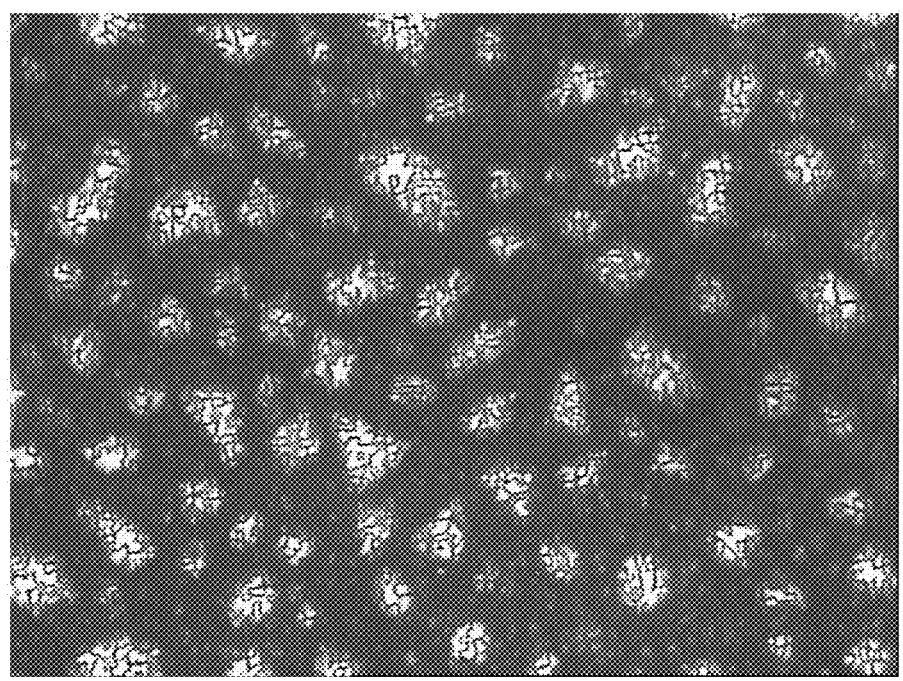
FIG. 5 is a polarizing microscope photograph showing the mixture of the liquid crystal molecules and the ethylene-vinyl acetate copolymers when the flexible display panel of Example 1 of the present invention is bent.

FIG. 5 is a polarizing microscope photograph of a flexible display panel when the liquid crystal film layer thereof is pressed (bent). It can be seen from FIG. 5 that there are many bright regions that are disconnected to each other in the liquid crystal film layer, which are the distribution regions of the liquid crystal molecules. In contrast, the ethylene-vinyl acetate copolymers are present in dark regions under the polarizing microscope. The alternate bright and dark regions in FIG. 5 indicate that the liquid crystal molecules distribute uniformly in the ethylene-vinyl acetate copolymers even when the display panel is bent and that the orientation of the liquid crystal molecules is achieved when the flexible liquid crystal display panel of the present invention is bent.

EXAMPLES

Advantages and embodiments of the present invention are further illustrated by the following examples, but the particular materials and amounts thereof recited in these examples, as well as other conditions and details, should not be construed to unduly limit the invention.

Example 1: Preparation of the Ethylene-Vinyl Acetate Copolymer

An ethylene-vinyl acetate copolymer was prepared in this example, wherein the mass percent of the vinyl acetate monomeric unit in the copolymer was 20% and the number average molecular weight of the ethylene-vinyl acetate copolymer was 50,000.

It should be understood that the preparation method of the above ethylene-vinyl acetate copolymer belongs to the prior art which will not be described in detail herein.

After the small-molecular substances were removed with solvent, the ethylene-vinyl acetate copolymer was observed by a scanning electron microscope. It can be seen from FIG. 1 that the ethylene-vinyl acetate copolymers formed a network structure and had sheet shape in the microscopic morphology, which allowed small-molecular substances (e.g. the liquid crystal molecules) to be anchored in the meshes of the network structure and to be induced to orientate in accordance with the arrangement of the ethylene-vinyl acetate copolymers.

Example 2: Preparation of the Liquid Crystal Film Layer and the Display Panel

A liquid crystal film layer was prepared in this example, which comprised the ethylene-vinyl acetate copolymers as prepared in example 1 and liquid crystal molecules dispersed in the meshes of the network formed by the ethylene-vinyl acetate copolymers.

Wherein, the mass percent of the ethylene-vinyl acetate copolymers based on the liquid crystal film layer was 20%, the thickness of the liquid crystal film layer was 2 µm, the liquid crystal molecules were SLC1717 (available from Chengzhi Yonghua Liquid Crytal Materials Co., Ltd.) and the mass percent of which was 80% based on the liquid crystal film layer.

The liquid crystal molecules SLC1717 and the ethylene-vinyl acetate copolymers prepared in example 1 were mixed vigorously to uniform at room temperature at the above ratio (the mixing ratio of the liquid crystal molecules to the ethylene-vinyl acetate copolymers was 80:20 by mass) so as to obtain a liquid crystal mixture. The obtained liquid crystal mixture was coated on a first flexible substrate using the spin coating method to form a liquid crystal film layer having a thickness of 2 µm. The first flexible substrate was a flexible substrate with an electrode of indium tin oxide, which was prepared by bonding the PET substrate to the ITO substrate, then depositing the structures of RGB and BM and releasing the PET substrate etched with these structures from the ITO substrate.

A second flexible substrate was brought into contact the above liquid crystal film layer and then they were laminated together by aligning with each other under vacuum. A flexible liquid crystal display panel was obtained. The second flexible substrate was a flexible array substrate which was prepared by bonding the PET substrate to the ITO substrate, then depositing the TFT structure and releasing the PET substrate etched with the TFT structure from the ITO substrate.

FIG. 5 is a polarizing microscope photograph of the flexible display panel of this example when the liquid crystal film layer thereof is pressed (bent). It can be seen from FIG. 5 that there were many bright regions that were disconnected to each other in the liquid crystal film layer, which were the distribution regions of the liquid crystal molecules. In contrast, the ethylene-vinyl acetate copolymers were present in dark regions under the polarizing microscope. The alternate bright and dark regions in FIG. 5 indicated that the liquid crystal molecules distributed uniformly in the ethylene-vinyl acetate copolymers even when the display panel was bent and that the orientation of the liquid crystal molecules was achieved when the flexible liquid crystal display panel of the present invention was bent.

Test Example 1

The display effect was tested on the above flexible liquid crystal display panel. The test results showed that the contrastivity and the response time of the liquid crystal meet the requirements for a liquid crystal display device.

Example 3: Preparation of the Ethylene-Vinyl Acetate Copolymer

In this example, an ethylene-vinyl acetate copolymer was prepared in the same way with that of example 1 except that, the mass percent of the vinyl acetate monomeric unit in the copolymer was 35% and the number average molecular weight of the ethylene-vinyl acetate copolymer was 10,000.

It should be understood that, the preparation method of the above ethylene-vinyl acetate copolymer belongs to the prior art which will not be described in detail herein.

After the small-molecular substances were removed with solvent, the ethylene-vinyl acetate copolymer was observed by a scanning electron microscope. The result was the same as shown in FIG. 1, wherein the ethylene-vinyl acetate copolymers formed a network structure and had sheet shape in the microscopic morphology, which allowed small-molecular substances (e.g. the liquid crystal molecules) to be anchored in the meshes of the network structure and to be induced to orientate in accordance with the arrangement of the ethylene-vinyl acetate copolymers.

Example 4: Preparation of the Liquid Crystal Film Layer and the Display Panel

In this example, a liquid crystal film layer was prepared in the same way with that of example 2. The liquid crystal film layer comprised the ethylene-vinyl acetate copolymers as prepared in example 3 and liquid crystal molecules dispersed in the meshes of the network formed by the ethylene-vinyl acetate copolymers.

The differences are that the mass percent of the ethylene-vinyl acetate copolymers based on the liquid crystal film layer was 5%, the thickness of the liquid crystal film layer was 3 µm, the liquid crystal molecules were SLC701 (available from Chengzhi Yonghua Liquid Crytal Materials Co., Ltd.) and the mass percent of which was 95% based on the liquid crystal film layer.

Specifically, the liquid crystal molecules SLC701 and the ethylene-vinyl acetate copolymers prepared in example 3 were mixed vigorously to uniform at room temperature at the above ratio (the mixing ratio of the liquid crystal molecules to the ethylene-vinyl acetate copolymers was 95:5 by mass) so as to obtain a liquid crystal mixture. The obtained liquid crystal mixture was coated on a first flexible substrate using the spin coating method to form a liquid crystal film layer having a thickness of 3 µm. The first flexible substrate was a flexible substrate with an electrode of indium tin oxide, which was prepared by bonding the PET substrate to the ITO substrate, then depositing the structures of RGB and BM and releasing the PET substrate etched with these structures from the ITO substrate.

A second flexible substrate was brought into contact the above liquid crystal film layer and then they were laminated together by aligning with each other under vacuum. A flexible liquid crystal display panel was obtained. The second flexible substrate was a flexible array substrate which was prepared by bonding the PET substrate to the ITO substrate, then depositing the TFT structure and releasing the PET substrate etched with the TFT structure from the ITO substrate.

The polarizing microscope photograph of the flexible liquid crystal display panel of this example when the liquid crystal film layer was pressed (bent) was the same as shown in FIG. 5. There were many bright regions that are disconnected to each other in the liquid crystal film layer, which were the distribution regions of the liquid crystal molecules. In contrast, the ethylene-vinyl acetate copolymers were present in dark regions under the polarizing microscope. The alternate bright and dark regions indicated that the liquid crystal molecules distributed uniformly in the ethylene-vinyl acetate copolymers even when the display panel was bent and that the orientation of the liquid crystal molecules was achieved when the flexible liquid crystal display panel of the present invention was bent.

Test Example 2

The display effect was tested on the above flexible liquid crystal display panel. The test results showed that the contrastivity and the response time of the liquid crystal meet the requirements for a liquid crystal display device.

Example 5: Preparation of the Ethylene-Vinyl Acetate Copolymer

In this example, an ethylene-vinyl acetate copolymer was prepared in the same way with that of example 1 except that, the mass percent of the vinyl acetate monomeric unit in the copolymer was 25% and the number average molecular weight of the ethylene-vinyl acetate copolymer was 100,000.

It should be understood that, the preparation method of the above ethylene-vinyl acetate copolymer belongs to the prior art which will not be described in detail herein.

After the small-molecular substances were removed with solvent, the ethylene-vinyl acetate copolymer was observed by a scanning electron microscope. The result was the same as shown in FIG. 1, wherein the ethylene-vinyl acetate copolymers formed a network structure and had sheet shape in the microscopic morphology, which allowed small-molecular substances (e.g. the liquid crystal molecules) to be anchored in the meshes of the network structure and to be induced to orientate in accordance with the arrangement of the ethylene-vinyl acetate copolymers.

Example 6: Preparation of the Liquid Crystal Film Layer and the Display Panel

In this example, a liquid crystal film layer was prepared in the same way with that of example 2. The liquid crystal film layer comprised the ethylene-vinyl acetate copolymers as prepared in example 5 and liquid crystal molecules dispersed in the meshes of the network formed by the ethylene-vinyl acetate copolymers.

The differences are that the mass percent of the ethylene-vinyl acetate copolymers based on the liquid crystal film layer was 30%, the thickness of the liquid crystal film layer was 10 μm, the liquid crystal molecules were E78 (available from Merk Company) and the mass percent of which was 70% based on the liquid crystal film layer.

Specifically, the liquid crystal molecules E78 and the ethylene-vinyl acetate copolymers prepared in example 5 were mixed vigorously to uniform at room temperature at the above ratio (the mixing ratio of the liquid crystal molecules to the ethylene-vinyl acetate copolymers was 70:30 by mass) so as to obtain a liquid crystal mixture. The obtained liquid crystal mixture was coated on a first flexible substrate using the spin coating method to form a liquid crystal film layer having a thickness of 10 μm. The first flexible substrate was a flexible substrate with an electrode of indium tin oxide, which was prepared by bonding the PET substrate to the ITO substrate, then depositing the structures of RGB and BM and releasing the PET substrate etched with these structures from the ITO substrate.

A second flexible substrate was brought into contact the above liquid crystal film layer and then they were laminated together by aligning with each other under vacuum. A flexible liquid crystal display panel was obtained. The second flexible substrate was a flexible array substrate which was prepared by bonding the PET substrate to the ITO substrate, then depositing the TFT structure and releasing the PET substrate etched with the TFT structure from the ITO substrate.

The polarizing microscope photograph of the flexible liquid crystal display panel of this example when the liquid crystal film layer was pressed (bent) was the same as shown in FIG. 5. There were many bright regions that are disconnected to each other in the liquid crystal film layer, which were the distribution regions of the liquid crystal molecules. In contrast, the ethylene-vinyl acetate copolymers were present in dark regions under the polarizing microscope. The alternate bright and dark regions indicated that the liquid crystal molecules distributed uniformly in the ethylene-vinyl acetate copolymers even when the display panel was bent and that the orientation of the liquid crystal molecules was achieved when the flexible liquid crystal display panel of the present invention was bent.

Test Example 3

The display effect was tested on the above flexible liquid crystal display panel. The test results showed that the contrastivity and the response time of the liquid crystal meet the requirements for a liquid crystal display device.

Example 7: Preparation of the Ethylene-Vinyl Acetate Copolymer

In this example, an ethylene-vinyl acetate copolymer was prepared in the same way with that of example 1 except that, the mass percent of the vinyl acetate monomeric unit in the copolymer was 35% and the number average molecular weight of the ethylene-vinyl acetate copolymer was 80,000.

It should be understood that, the preparation method of the above ethylene-vinyl acetate copolymer belongs to the prior art which will not be described in detail herein.

After the small-molecular substances were removed with solvent, the ethylene-vinyl acetate copolymer was observed by a scanning electron microscope. The result was the same as shown in FIG. 1, wherein the ethylene-vinyl acetate copolymers formed a network structure and had sheet shape in the microscopic morphology, which allowed small-molecular substances (e.g. the liquid crystal molecules) to be anchored in the meshes of the network structure and to be induced to orientate in accordance with the arrangement of the ethylene-vinyl acetate copolymers.

Example 8: Preparation of the Liquid Crystal Film Layer and the Display Panel

In this example, a liquid crystal film layer was prepared in the same way with that of example 2. The liquid crystal film layer comprised the ethylene-vinyl acetate copolymers as prepared in example 7 and liquid crystal molecules dispersed in the meshes of the network formed by the ethylene-vinyl acetate copolymers.

The differences are that the mass percent of the ethylene-vinyl acetate copolymers based on the liquid crystal film layer was 15%, the thickness of the liquid crystal film layer was 30 μm, the liquid crystal molecules were SLC099535 (available from Chengzhi Yonghua Liquid Crytal Materials Co., Ltd.) and the mass percent of which was 85% based on the liquid crystal film layer.

Specifically, the liquid crystal molecules SLC099535 and the ethylene-vinyl acetate copolymers prepared in example 7 were mixed vigorously to uniform at room temperature at the above ratio (the mixing ratio of the liquid crystal molecules to the ethylene-vinyl acetate copolymers was 85:15 by mass) so as to obtain a liquid crystal mixture. The obtained liquid crystal mixture was coated on a first flexible substrate using the spin coating method to form a liquid crystal film layer having a thickness of 30 μm. The first flexible substrate was a flexible substrate with an electrode of indium tin oxide, which was prepared by bonding the PET substrate to the ITO substrate, then depositing the structures of RGB and BM and releasing the PET substrate etched with these structures from the ITO substrate.

A second flexible substrate was brought into contact the above liquid crystal film layer and then they were laminated together by aligning with each other under vacuum. A flexible liquid crystal display panel was obtained. The second flexible substrate was a flexible array substrate which was prepared by bonding the PET substrate to the ITO substrate, then depositing the TFT structure and releasing the PET substrate etched with the TFT structure from the ITO substrate.

The polarizing microscope photograph of the flexible liquid crystal display panel of this example when the liquid crystal film layer was pressed (bent) was the same as shown in FIG. 5. There were many bright regions that are disconnected to each other in the liquid crystal film layer, which were the distribution regions of the liquid crystal molecules. In contrast, the ethylene-vinyl acetate copolymers were present in dark regions under the polarizing microscope. The alternate bright and dark regions indicated that the liquid crystal molecules distributed uniformly in the ethylene-vinyl acetate copolymers even when the display panel was bent and that the orientation of the liquid crystal molecules was achieved when the flexible liquid crystal display panel of the present invention was bent.

Test Example 4

The display effect was tested on the above flexible liquid crystal display panel. The test results showed that the contrastivity and the response time of the liquid crystal meet the requirements for a liquid crystal display device.

It should be understood that the present invention is not intended to be limited to the embodiments set forth above for illustrative purposes. Various modifications and alterations of the invention will be apparent to those skilled in the art without departing from the scope and spirit of the invention. Such modifications and alterations are included in the scope of the present invention.

The invention claimed is:

1. A liquid crystal film layer characterized by comprising: ethylene-vinyl acetate copolymers which form a network structure; and rod-shaped liquid crystal molecules dispersed in the network structure formed by the ethylene-vinyl acetate copolymers, wherein the mass percent of the vinyl acetate monomeric unit in the ethylene-vinyl acetate copolymers is in the range of 20-35%; and the number average molecular weight of the ethylene-vinyl acetate copolymers is in the range of 10,000 to 100,000, wherein in the liquid crystal film layer, each of the rod-shaped liquid crystal molecules is anchored in meshes of the network structure and therefore is induced to orientate in accordance with the arrangement of the ethylene-vinyl acetate copolymers.

2. The liquid crystal film layer according to claim 1, characterized in that the mass percent of the ethylene-vinyl acetate copolymers based on the liquid crystal film layer is in the range of 5-30%.

3. The liquid crystal film layer according to claim 1, characterized in that the mass percent of the liquid crystal molecules based on the liquid crystal film layer is in the range of 70-95%.

4. The liquid crystal film layer according to claim 1, characterized in that the liquid crystal film layer has a thickness in the range of 2-30 μm.

5. The liquid crystal film layer according to claim 4, characterized in that the liquid crystal film layer has a thickness in the range of 3-10 μm.

6. A display panel comprising the liquid crystal film layer according to claim 1, a first flexible substrate on the first side of the liquid crystal film layer and a second flexible substrate on the second side of the liquid crystal film layer opposite to the first side.

7. A method for preparing the display panel according to claim 6, comprising the following steps:
   1) mixing liquid crystal molecules with ethylene-vinyl acetate copolymers to obtain a liquid crystal mixture;
   2) coating the liquid crystal mixture on the first flexible substrate so as to form a liquid crystal film layer on the first flexible substrate; and
   3) contacting the second flexible substrate with the liquid crystal film layer on the first flexible substrate and laminating them together.

8. The method according to claim 7, characterized in that the mass percent of the vinyl acetate monomeric unit in the ethylene-vinyl acetate copolymer is in the range of 20-35%; and the number average molecular weight of the ethylene-vinyl acetate copolymer is in the range of 10,000 to 100,000.

9. The method according to claim 7, characterized in that the mass percent of the vinyl acetate monomeric unit in the ethylene-vinyl acetate copolymer is in the range of 25-35%.

10. The method according to claim 7, characterized in that in step 1), the mixing ratio of the liquid crystal molecules to the ethylene-vinyl acetate copolymers is in the range of 70:30 to 95:5 by mass.

11. The method according to claim 7, characterized in that the mass percent of the ethylene-vinyl acetate copolymers based on the liquid crystal film layer is in the range of 5-30%.

12. The method according to claim 7, characterized in that the mass percent of the liquid crystal molecules based on the liquid crystal film layer is in the range of 70-95%.

13. The method according to claim 7, characterized in that the liquid crystal film layer has a thickness in the range of 2-30 μm.

14. The method according to claim 7, characterized in that the liquid crystal film layer has a thickness in the range of 3-1 μm.

15. The liquid crystal film layer according to claim 1, characterized in that the mass percent of the vinyl acetate monomeric unit in the ethylene-vinyl acetate copolymers is in the range of 25-35%.

* * * * *